Patented Jan. 10, 1950

2,493,798

UNITED STATES PATENT OFFICE 2,493,798

POLYCHLOROPRENE AND PREPARATION THEREOF

Henry H. Abernathy, Wilmington, and George W. Scott, Claymont, Del., assignors to E. I. du Pont de Nemours & Company, Wilmington, Del., a corporation of Delaware No Drawing. Application July 8, 1947, Serial No. 759,686

6 Claims. (Cl. 260—27)

This invention relates to polychloroprene having improved resistance to hardening on storage.

Polychloroprene films, paticularly those that are not vulcanized, prepared from polychloroprene latices, tend to harden or freeze during storage, and this property tends to prevent the use of such latices in the manufacture of articles where stiffening or hardening of the polychloroprene film cannot be tolerated, such as in the impregnation of paper where soft and flexible products are desired, or in the preparation of articles such as balloons, etc., where soft polymers of low modulus of elasticity are particularly desirable. While softer polymers having a low modulus of elasticity can be obtained by increasing the amount of modifying agent employed during the emulsion polymerization, the resulting polymers usually harden rapidly on aging. The interpolymerization of chloroprene with other polymerizable compounds such as isoprene has also been found to give products which have improved freeze resistance at low temperatures, but generally such co-polymers are lacking in other desired properties. The addition of oils to the polychloroprene latex to produce softer films also carries with it certain disadvantages and objectionable properties in the resulting polychloroprene films.

It is therefore an object of the present invention to provide a process for preparing stable polychloroprene latices from which the solid materials, deposited, for example, by precipitation or evaporation or by absorption on fibrous material, have low modulus of elasticity and resist hardening during storage, particularly when in the unvulcanized state. A further object is to provide polychloroprene having such improved properties.

We have found that, when the polymerization of chloroprene containing a rosin ester is carried out in an alkaline rosinate emulsion, the solid materials deposited from the resulting latices are resistant to hardening and have lower modulus of elasticity. The amount of rosin ester which should be used in the alkaline emulsion polymerization may vary from 16% to 120% of the weight of the chloroprene which is to be polymerized. In order to obtain a dispersion of good stability, it is desirable that the emulsifying agent employed in producing the alkaline emulsion be a water soluble salt of a rosin acid. The amount of the soluble salt of the rosin acid which is to be used may be varied within quite definite limits.

In order to obtain a latex dispersion of good stability, the water soluble salt of a rosin acid used as the emulsifying agent should be employed in an amount not less than a calculated percentage by weight of the total chloroprene and rosin ester to be emulsified, which minimum percentage in parts by weight is determined by dividing by 20 the number of parts of rosin ester used per 100 parts of chloroprene, and adding 3.5. The maximum amount should not be greater than 15% of the total weight of the chloroprene and rosin ester, since larger quantities tend to introduce polymerization difficulties in the same manner as the use of excessive amounts of soaps employed in the usual methods of carrying out emulsion polymerizations of chloroprene.

The following examples are given to illustrate more fully the invention. The parts used are by weight, unless otherwise specified.

EXAMPLE 1

A solution of 320 grams of ester gum (glycerol abietate), 79.2 grams of Nancy wood rosin and 1 gram of iodoform in 1000 grams of chloroprene is emulsified in a solution of 8 grams of potassium persulfate and 16.65 grams of sodium hydroxide (97% pure) in 1400 cc. of water and then polymerized at 40° C. When approximately 80%–85% of the chloroprene has polymerized, as indicated by the density, 10 cc. of a 10% potassium ferricyanide is added to complete the polymerization.

The above latex, when compounded in the following formula:

| | Parts |
|---|---|
| Latex solids | 100 |
| Phenyl beta-naphthlyamine | 2 |
| Clay | 10 |
| Zinc oxide | 5 | gives uncured air dried films which are softer (Shore Durometer Hardness equal to 27) than comparable films made from rosin ester-free polychloroprene latices (Shore hardness: 43). In addition, the films are more resistant to hardening. For example, at 16° C. the above film with Shore hardness of 27 changed to a Shore hardness of only 44 in 155 days, while the rosin ester-free film changed from 43 to 64 in 42 days.

The latex made in the presence of rosin esters gives an improved impregnation of paper and this paper is softer, more flexible and has improved "feel" over papers made with rosin ester-free polychloroprene latices. Moreover, the paper remains flexible much longer.

This high rosin ester latex gives films which have much lower moduli than films from latices made in the absence of the rosin esters.

EXAMPLE 2

The rosin ester content of the original emulsion can be varied over wide limits to give latices with polymers of varying degrees of hardness if the amount of rosinate soap is kept within the limits given in the general statement in order to obtain stable emulsions during polymerization. Table I lists the rosin ester (glycerol abietate) and rosinate soap concentrations used in representative preparations together with the Shore hardness values of compounded films from the resulting latices. All the latices represented were stable during preparation. They were compounded and tested as described in Example 1.

TABLE I

| Parts of Ester Gum per 100 parts Chloroprene | Parts of Nancy Wood Rosin per 100 parts Chloroprene | Shore Hardness of Compounded Film |
|---|---|---|
| 0 | 4.00 | 43 |
| 32 | 7.92 | 27 |
| 40 | 8.40 | 25 |
| 40 | 11.20 | 25 |
| 50 | 9.00 | 18 |
| 50 | 12.00 | 20 |
| 60 | 12.80 | 7 |
| 80 | 16.40 | 8 |
| 100 | 20.00 | 4 |
| 120 | 22.00 | 5 |

In storage tests at 16° C. these films all remained soft and flexible for over 113 days, whereas films from rosin ester-free latex were hard and unusable within 49 days.

EXAMPLE 3

Esters of abietic acid, in addition to glycerol abietate, which have been used in recipes similar to that described in Example 1 to give the same type of soft, non-hardening polymers, are:

Glycerol ester of hydrogenated rosin
Pentaerythritol ester of rosin
Methyl ester of rosin
Hydrogenated methyl ester of rosin

EXAMPLE 4

Polymerization in the presence of rosin esters over a range of temperatures gives soft polymers which are resistant to hardening, the resistance increasing as the temperature of polymerization is raised. These polymerizations were made using a recipe similar to that in Example 1 and varying only the temperature.

TABLE II

Latices made in the presence of rosin ester

| Temperature of Polymerization | Shore Hardness of Compounded Films | Shore Hardness after 550 Hours at −15° C. |
|---|---|---|
| °C. | | |
| 40 | 18 | 52 |
| 45 | 19 | 42 |
| 50 | 19 | 32 |
| 55 | 21 | 36 |

A comparison of Table II with Table III (similar latices made in the absence of rosin esters) shows the great effect of the rosin ester on the properties of the polymer in relation to the slight improvement in freeze resistance as a result of temperature increase. The latices of both tables were compounded as in Example 1.

TABLE III

Latices made without rosin ester

| Temperature of Polymerization | Shore Hardness of Compounded Films | Hours at −15° C. before Reaching Shore Hardness of 60 [1] |
|---|---|---|
| °C. | | |
| 40 | 43 | 19 |
| 45 | 47 | 24 |
| 50 | 46 | 40 |
| 55 | 40 | 120 |

[1] Shore Hardness of 60 in the above uncured compounds gives films too stiff to use.

EXAMPLE 5

Interpolymerization of chloroprene and 2,3-dichlorobutadiene-1,3 mixtures containing rosin ester dissolved in the original monomers gives a softer interpolymer with improved resistance to hardening. The recipe used was the same as that in Example 1, with 5% of the chloroprene replaced with 2,3-dichlorobutadiene-1,3. The films were compounded as in Example 1.

TABLE IV

| Latex | Original Shore Hardness on Compounded Film | Shore Hardness after X hours at −15° C. |
|---|---|---|
| 95-Chloroprene-5-(2,3-dichlorobutadiene-1,3); no rosin ester present. | 34 | 60 after 120 hrs. |
| 95-Chloroprene-5-(2,3-dichlorobutadiene-1,3) made in the presence of rosin ester. | 19 | 34 after 550 hrs. |

EXAMPLE 6

Addition of an alkaline rosinate emulsion of chloroprene containing rosin ester to an alkaline rosinate emulsion of chloroprene which has already been polymerized to approximately 95% conversion and then continuing the polymerization to substantially 100% conversion to polymer of all the chloroprene present, gives a latex with the same soft and hardening-resistant polymer as the latex prepared in which the rosin ester is present throughout the polymerization.

Such a procedure gives a more economical preparation of these latices. The greater part of the polymerization, over 80%, can be carried out in the absence of the rosin ester, and hence the total chloroprene per charge in the first step can be increased approximately 33%. Furthermore, the second part of the polymerization, in which the above latex is blended with the emulsion of chloroprene containing the rosin ester and the polymerization is completed, can be run in large equipment with less cooling because most of the chloroprene is already polymerized and there is relatively little heat that has to be dissipated in this second step.

The emulsion used for the first stage of this stepwise polymerization consisted of:

|  | Grams |
|---|---|
| Chloroprene | 500 |
| Nancy wood rosin | 20 |
| Iodoform | 0.5 |
| Sulfur | 0.05 |
| Water | 500 |
| Sodium hydroxide (97%) | 5.3 |
| Potassium persulfate | 2.0 |

This emulsion was polymerized at 40° C. to a specific gravity of 1.093 and then the following emulsion was added:

|  | Grams |
|---|---|
| Chloroprene | 100 |
| Ester gum | 192 |
| Nancy wood rosin | 27.5 |
| Iodoform | 0.1 |
| Water | 300 |
| Sodium hydroxide | 6.23 |

After complete mixing, 56 cc. of 5% potassium persulfate and 7.2 cc. of 10% potassium ferricyanide were added and the polymerization was continued at 40° C. to substantially a 100% conversion of all the chloroprene present.

Table V shows how this polymer compares in softness and freeze resistance to the polymer made in the presence of rosin ester throughout the entire polymerization cycle.

TABLE V

| Latex | Shore Hardness on Compounded[1] Film | Shore Hardness after 550 hrs. at −15° C. |
|---|---|---|
| Control (Latex as in Example 1) | 21 | 49 |
| Stepwise Polymerized Latex | 22 | 46 |

[1] Compounding formula:
Latex solids _____ 100
Zince oxide _____ 5
N,N'-di-beta-naphthyl-p-Phenylene diamine _____ 1

EXAMPLE 7

The alkaline rosinate emulsion polymerization of chloroprene containing a rosin ester gives a latex containing a softer and more freeze-resistant polymer than can be produced by carrying out the polymerization in the absence of rosin ester and then adding the rosin ester to the finished latex. Table VI shows a comparison of the polymer from a latex made by adding rosin ester to a finished polychloroprene latex with that from a latex in which the rosin ester was present throughout the polymerization. The latices were compounded and tested as in Example 6.

TABLE VI

| Preparation of Latex | Shore Hardness of Compounded Film | Shore Hardness after X hrs. at −15° C. |
|---|---|---|
| Polymerized in presence of rosin ester (Latex of Example 1) | 21 | 46 after 550 hrs. |
| Latex+rosin ester dispersion[1] | 30 | 61 after 131 hrs. |

[1] This dispersion was prepared by removing the chloroprene from the following emulsion by distillation, polymerization of the chloroprene being prevented by the phenothiazine (thiodiphenylamine):

```
                                                     Grams
Chloroprene _____ 100
Nancy wood rosin _____ 22
Ester gum _____ 120
Phenothiazine _____ 0.1
Water _____ 242
Sodium hydroxide (97%) _____ 3.79
```

The above examples show that softer and more freeze resistant polychloroprene polymers can be prepared by the alkaline rosinate emulsion polymerization of chloroprene which contains a rosin ester dissolved therein, and that these polymers cannot be duplicated by mixing the finished polychloroprene latex with rosin ester.

The rosin ester may be varied over a wide range of concentrations, the preferred concentrations are from 16 to 120 parts of rosin ester per 100 parts of chloroprene; with the specially preferred concentrations being from 25 to 75 parts. The rosin concentration used for forming the emulsifying agent depends on the ratio of rosin ester to chloroprene in the original mixture as explained above. An excess of sodium hydroxide over that required to neutralize the rosin and the rosin ester (which has some acidity) is used; 40%–80% excess is preferred in order to obtain the minimum viscosity rise during polymerization.

The emulsion concentration may be varied from 1% to 60% of chloroprene plus rosin ester, with the preferred concentrations being 40% to 50%. The latices prepared in dilute emulsions may be concentrated to higher solids latices by removal of water either by creaming or by distillation.

The polymerization temperature may be varied from 10° C. to 100° C., with the preferred temperatures being from 40° to 55° C.

Polymerizable monomers may be substituted for up to 25% of the original chloroprene and the interpolymerization carried out in the presence of rosin esters to give polymers which are softer and which have improved resistance to hardening. The preferred amount of second polymerizable is from 2% to 10% of the total monomer. The second polymerizable monomer may be a vinyl or vinylidene compound, such as styrene, acrylonitrile, methyl acrylate, methyl methacrylate, vinyl pyridine, etc., or a diene such as 2,3-dichlorobutadiene-1,3, butadine, isoprene, etc., which is capable of interpolymerizing with chloroprene.

Rosin esters from either monohydric aliphatic alcohols, such as methyl, ethyl, etc., or polyhydric alcohols such as ethylene glycol, glycerol, pentaerythritol, etc., which have up to 5 carbon atoms and contain not more than 4 hydroxyl groups, can be used to give these softer polymers which have improved resistance to hardening. The rosin used to form these esters may be, for example, gum or wood rosin, where it is understood that the principal component of the rosin is abietic acid. The rosin used may also be a hydrogenated rosin, a disproportionated rosin or a polymerized rosin, all of which give esters which are effective. These rosins form esters in the same manner as the unmodified rosins. In the latter cases the modification of the rosin component may be carried out last. For example, wood rosin may first be esterified, then hydrogenated.

Likewise, the rosin used for emulsification may be, for example, wood or gum rosin, or the modified forms of rosin such as hydrogenated, disproportionated or polymerized rosin. The alkali used for neutralization of the rosin to give the soap may be either sodium, potassium or ammonium hydroxide, or any other base which gives water-soluble rosinates.

It is to be understood that the expressions "a rosin ester" and "a rosin acid" are, unless otherwise limited, used in this application to mean the esters and acids of both the naturally occurring materials and the hydrogenated, disproportionated and polymerized products derived therefrom.

Modification of the polymerization may be accomplished with any of the conventional modifiers of chloroprene polymerization such as iodoform, sulfur, alkyl mercaptans, allylic or benzylic iodides, etc., or their combinations. The invention is also applicable to systems in which no modifying agent is used.

The polymerization may be accelerated by the use of percompounds such as persulfates, percarbonates and organic and inorganic peroxides. The complex cyanides, such as potassium ferricyanide, etc., may also be used to advantage for the purpose.

This invention provides polychloroprene latices which contain soft polymers that have excellent resistance to hardening both at room temperature and at lower temperatures. Latices having these properties find wide application where films which are resistant to hardening are desired, particularly in the coating and impregnation of fibrous materials such as paper, asbestos, etc., where the retention of flexibility of the uncured films is required. Moreover, these latices show more rapid penetration of the paper, resulting in improved impregnation and in an improved "feel" of the paper. The softer polymer is particularly desirable in certain applications where low modulus stocks are desired, such as in the manufacture of balloons. In addition, the latex finds wide utility as a blending agent for conventional polychloroprene latices, where softer products are desired, since it acts as a vulcanizable plasticizer while at the same time improving the freeze resistance of the product. These latices comprising softer polymers will tolerate more filler than the conventional latices in compounding to yield films of a given hardness, for example, "sizing" latex compounds in rug backing, and this results in substantial reductions in the amount of latex required.

We claim:

1. A process for producing polychloroprene latices which are particularly suitable for the impregnation of paper, as blending agents for conventional polychloroprene latices and for the production of films which have a low modulus of elasticity and which are resistant to hardening during storage, which comprises polymerizing in an alkaline aqueous emulsion and in the presence of a chloroprene polymerization catalyst chloroprene containing from 16 parts to 120 parts per 100 parts of chloroprene of a rosin ester obtained from an alcohol containing not more than 5 carbon atoms and not more than 4 hydroxyl groups, a water soluble salt of a rosin acid being employed as the emulsifying agent in an amount in parts by weight of not less than one-twentieth of the number of parts of rosin ester present in the latex per 100 parts of chloroprene plus 3.5 parts and not greater than 15% of the total weight of the chloroprene and rosin ester employed.

2. A process for producing polychloroprene latices which are particularly suitable for the impregnation of paper, as blending agents for conventional polychloroprene latices and for the production of films which have a low modulus of elasticity and which are resistant to hardening during storage, which comprises polymerizing in an alkaline aqueous emulsion and in the presence of a chloroprene polymerization catalyst chloroprene containing from 16 parts to 120 parts per 100 parts of chloroprene of glycerol abietate, a water soluble salt of a rosin acid being employed as the emulsifying agent in an amount in parts by weight of not less than one-twentieth of the number of parts of rosin ester present in the latex per 100 parts of chloroprene plus 3.5 parts and not greater than 15% of the total weight of the chloroprene and rosin ester employed.

3. A process for producing polychloroprene latices which are particularly suitable for the impregnation of paper, as blending agents for conventional polychloroprene latices and for the production of films which have a low modulus of elasticity and which are resistant to hardening during storage, which comprises polymerizing in an alkaline aqueous emulsion and in the presence of a chloroprene polymerization catalyst chloroprene containing from 16 parts to 120 parts per 100 parts of chloroprene of glycerol hydorabietate, a water soluble salt of a rosin acid being employed as the emulsifying agent in an amount in parts by weight of not less than one-twentieth of the number parts of rosin ester present in the latex per 100 parts of chloroprene plus 3.5 parts and not greater than 15% of the total weight of the chloroprene and rosin ester employed.

4. A polychloroprene latex of good stability obtained by an alkaline aqueous emulsion polymerization of chloroprene in which from 16 parts to 120 parts per 100 parts of chloroprene of a rosin ester obtained from an alcohol containing not more than 5 carbon atoms and not more than 4 hydroxyl groups has previously been dissolved, in which a chloroprene polymerization catalyst was employed to accelerate the polymerization, which latex contains a soluble salt of a rosin acid which was employed as the emulsifying agent in the polymerization, the amount of the soluble salt of the rosin acid present in the latex being in parts by weight not less than one-twentieth of the number of parts of rosin ester present in the latex per 100 parts of chloroprene plus 3.5 parts, and being no greater than 15% of the total weight of chloroprene and rosin ester originally employed in producing the latex.

5. A polychloroprene latex of good stability obtained by an alkaline aqueous emulsion polymerization of chloroprene in which from 16 parts to 120 parts per 100 parts of chloroprene of glycerol abietate has previously been dissolved, in which a chloroprene polymerization catalyst was employed to accelerate the polymerization, which latex contains a soluble salt of a rosin acid which was employed as the emulsifying agent in the polymerization, the amount of the soluble salt of the rosin acid present in the latex being in parts by weight not less than one-twentieth of the number of parts of glycerol abietate present in the latex per 100 parts of chloroprene, plus 3.5 parts, and being no greater than 15% of the total weight of chloroprene and glycerol abietate originally employed in producing the latex.

6. A polychloroprene latex of good stability obtained by an alkaline aqueous emulsion polymerization of chloroprene in which from 16 parts to 120 parts per 100 parts of chloroprene of glycerol hydroabietate has previously been dissolved, in which a chloroprene polymerization catalyst was employed to accelerate the polymerization, which latex contains a soluble salt of a rosin acid which was employed as the emulsifying agent in the polymerization, the amount of the soluble salt of the rosin acid present in the latex being in parts by weight not less than one-twentieth of the number of parts of glycerol hydroabietate present in the latex per 100 parts of chloroprene, plus 3.5 parts, and being no greater than 15% of the total weight of chloroprene and glycerol hydroabietate originally employed in producing the latex.

HENRY H. ABERNATHY.
GEORGE W. SCOTT.

REFERENCES CITED

The following references are of record in the file of this patent:

UNITED STATES PATENTS

| Number | Name | Date |
|---|---|---|
| 2,264,173 | Collins | Nov. 25, 1941 |
| 2,271,474 | Boys | Jan. 27, 1942 |
| 2,382,731 | Little | Aug. 14, 1945 |